United States Patent
Nishimura et al.

(10) Patent No.: US 7,280,764 B2
(45) Date of Patent: Oct. 9, 2007

(54) OPTICAL SIGNAL MULTIPLEXER/DEMULTIPLEXER EMPLOYING PSEUDORANDOM MODE MODULATION

(75) Inventors: Ken A. Nishimura, Fremont, CA (US); Jonathan Simon, Castrovalley, CA (US)

(73) Assignee: Avago Technologies Fiber IP (Singapore) Pte Ltd, Singapore (SG)

( * ) Notice: Subject to any disclaimer, the term of this patent is extended or adjusted under 35 U.S.C. 154(b) by 1009 days.

(21) Appl. No.: 10/087,386

(22) Filed: Mar. 1, 2002

(65) Prior Publication Data

US 2004/0208634 A1  Oct. 21, 2004

(51) Int. Cl.
*H04B 10/00* (2006.01)

(52) U.S. Cl. .......................... 398/152; 398/77; 398/184

(58) Field of Classification Search .................. 398/65, 398/152, 154, 184, 188, 77, 78
See application file for complete search history.

(56) References Cited

U.S. PATENT DOCUMENTS

| | | | | |
|---|---|---|---|---|
| 3,956,626 | A | | 5/1976 | Ross et al. |
| 5,706,275 | A | * | 1/1998 | Zhengdi ...................... 370/204 |
| 5,900,957 | A | | 5/1999 | Van Der Tol ................ 359/139 |
| 5,959,750 | A | * | 9/1999 | Eskildsen et al. ............. 398/92 |
| 6,137,925 | A | | 10/2000 | Stimple et al. ................ 385/11 |
| 6,188,768 | B1 | | 2/2001 | Bethune et al. ............. 380/278 |
| 6,674,557 | B1 | * | 1/2004 | DaSilva et al. ............... 398/79 |
| 6,714,742 | B1 | * | 3/2004 | Hayee et al. .................. 398/65 |

OTHER PUBLICATIONS

Paul M. Hill et al., "Optical Polarization Division Multiplexing at 4Gb/s," IEEE Photonics Technology Letters, vol. 4 No. 5, May 1992 (pp. 500-502).

Takashi Ono et al., "Polarization Control Method for Suppressing Polarization Mode dispersion Influence in Optical Transmission Systems" Journal of Lightwave Technology, vol. 12 No. 5, May 1994 (pp. 891-898).

Zeuyan Zheng et al. "Suppression of Interferometric Crosstalk and ASE Noise Using a Polarization Multiplexing Technique and an SOA" IEEE Photonics Technology Letters, vol. 12 No. 8, Aug. 2000 (pp. 1091-1093).

Search report from corresponding application No. EP 02023243.5-2415 dated Aug. 8, 2005.

S. Särkimukka et al., "Mitigation of Polarization-Mode dispersion in Optical Multichannel Systems", Journel of Lightwave Technology, vol. 18 No. 10, Oct. 2000 (pp. 1374-1380).

Jonas Hansryd et al., "Impact of PMD on Four-Wave-Mixing-Induced Crosstalk in WDM Systems" Photonics Technology Letters, vol. 12 No. 9, Sep. 2000 (pp. 1261-1263).

Xiupu Zhang et al., "Polarization-Division Multiplexed Solitons in Optical Bifers with Polarization-Mode Dispersion" Photonics Technology Letters, vol. 10 No. 12, Dec. 1998 (pp. 1742-1744).

(Continued)

*Primary Examiner*—Dzung Tran

(57) ABSTRACT

An optical signal multiplexer/demultiplexer using an orthogonal pseudorandom (PRN) coding scheme for optical mode modulation to produce a plurality of independent optical signals that may be combined into one multiplex signal for transmission over an optical fiber to the receiving end, where the multiplex signal may be demultiplexed by relying on the orthogonal properties of the PRN code to isolate each independent optical signal from the transmitted multiplex signal. In channels subject to mode modulation distortion, one of the signal components may be used as a pilot signal to obtain a correction for channel mode modulation distortion. The PRN optical signal multiplexer/demultiplexer is particularly useful with polarization mode modulation.

31 Claims, 4 Drawing Sheets

OTHER PUBLICATIONS

Stephen G. Evangelides, Jr., "Polarization Multiplexing with Solitons," Journal of Lightwave Technology, vol. 10 No. 1, Jan. 1992 (pp. 28-35).

D. Wong et al., "Nonlinear Evolution of the Polarization Stes in WDM Channels," OFC '98 Technical Digest, #WD5, Wednesday Morning (pp. 125-127).

Behram Javidi et al., "Polarization Multiplexing for Information Security System," IEEE, Sep. 1999 (190-191).

Toshiaki Kuri et al., "Multiple Polarization Modulation (MPLM) system for Coherent Optical Space Communication" IEEE, May 1995 (pp. 2003-2007).

A.K. Srivastava et al., "A Polarization Multiplexing Technique to Mitigate WDM Crosstalk in SOAs" Photonics Technology Letters, vol. 12 No. 10, Oct. 2000 (pp. 1415-1416).

George C. Valley, "Optical Fiber Channels" Hughes Space and Communications, USA, Presider, CLEO'99, Tuesday Afternoon (pp. 181-182).

G. Kats et al.. "A Now FSK-Based Method for Coherent Optical CDMA Systems" IEEE, Jul. 2000 (pp. 194-196).

* cited by examiner

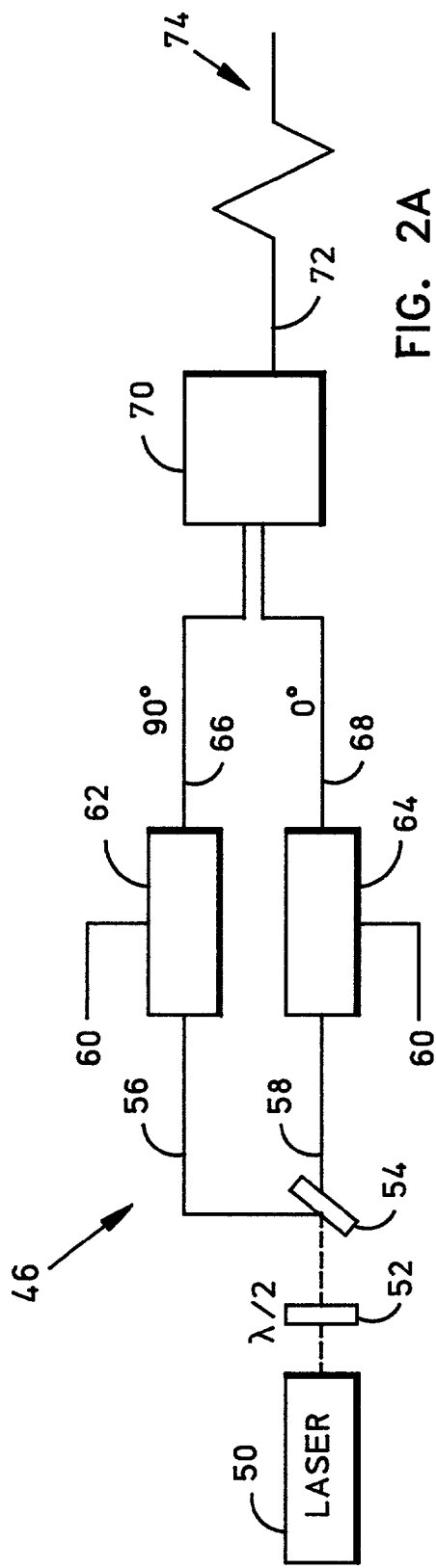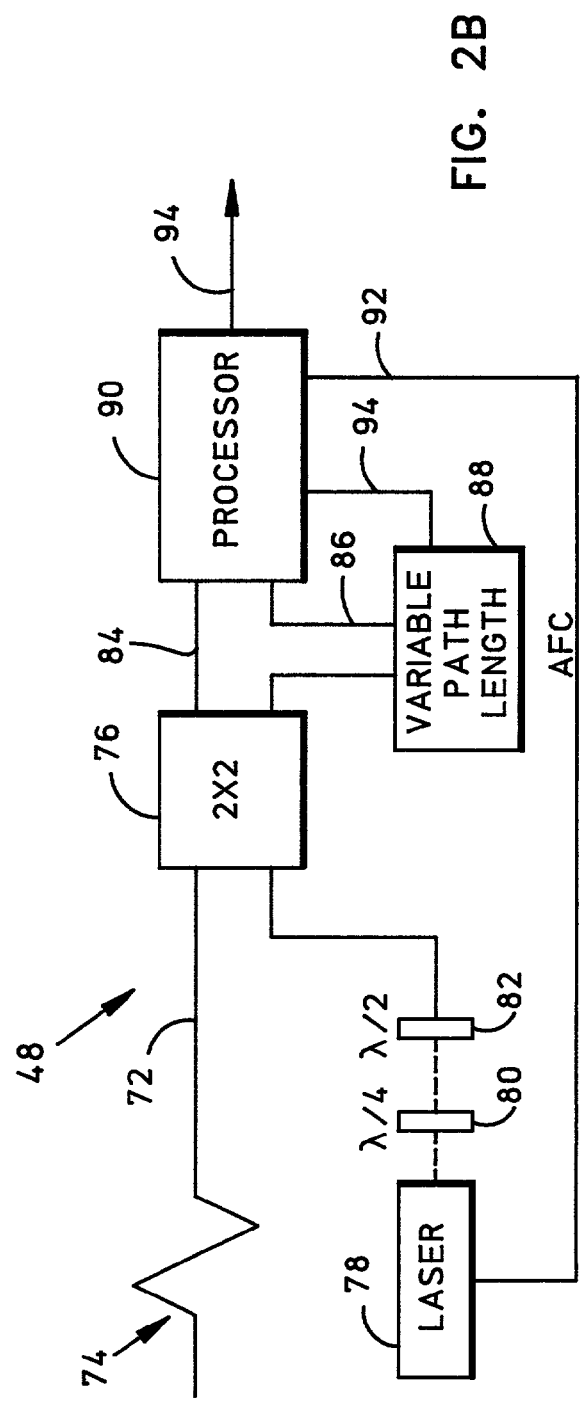

OPTICAL SIGNAL MULTIPLEXER/DEMULTIPLEXER EMPLOYING PSEUDORANDOM MODE MODULATION

BACKGROUND OF THE INVENTION

1. Field of the Invention

This invention relates generally to optical signal processing and more particularly to an optical multiplexing apparatus employing pseudorandom bit sequence (PRBS) mode modulation.

2. Description of the Related Art

Optical networks using wavelength-division-multiplexing (WDM) and Dense WDM (DWDM) techniques have been installed throughout the world in response to increasing demand for communications channel capacity. Recent advances in WDM and DWDM technology have focused on improving capacity with either smaller channel wavelength spacing or wider wavelength range. Channel spacing is limited by many factors, including optical filter efficacy, frequency drift, interferometric crosstalk, fiber dispersion and nonlinearity. The art is replete with various multiplexing proposals for obtaining additional capacity in existing optical fiber systems.

Some early practitioners proposed exploiting available WDM bandwidth by using a polarization-division-multiplexing (PDM) scheme in which independent WDM channel signals are simultaneously transmitted on orthogonal polarizations to reduce interchannel crosstalk and improve the operation of optical filtering of adjacent channels. For example, Hill et al. ("Optical Polarization Division Multiplexing at 4 Gb/s." *IEEE Photon. Technol. Lett.,*" Vol. 4, No. 5, pp. 500-502, May 1992) proposes challenging the speed bottleneck in the electronic circuit components used for time-division multiplexing operations by using a simple PDM system for doubling channel capacity by simultaneously transmitting two independent data sets as two optical signals having separate optical states of polarization (SOPs). Hill et al. distinguish PDM from the polarization shift keying (POLSK) technique used to transmit the bits from a single-word generator in any of two or more polarization states. The Hill et al. system uses simple coherent heterodyne detection to demultiplex the two signals and is admittedly impractical without additional (unspecified) polarization control techniques to compensate for the effects of PMD in fibers longer than a few thousand meters.

Generally, there is now an accepted understanding in the art that simple PDM in optical fibers longer than a few thousand meters is practical only for soliton (a solitary wave with nearly lossless propagation) trains because of polarization mode dispersion (PMD). In an early paper, Evangelides et al. ("Polarization Multiplexing with Solitons," *IEEE J. Lightwave Technol.,* Vol. 10, No. 1, pp. 28-35, January 1992) showed that solitons launched into a fiber with orthogonal polarization may be demultiplexed at the output (so long as crosstalk is avoided by ensuring the solitons do not overlap in time) because the common transit history of the solitons imposes identical polarization errors on each, thereby ensuring that the relative polarization orthogonality is undisturbed by any amount of PMD encountered in the fiber, even over distances of thousands of kilometers. Evangelides et al. note that the polarization channel separation possible with solitons is not possible with other pulses. Later, Ono et al. ("Polarization Control Method for Suppressing Polarization Mode Dispersion Influence in Optical Transmission Systems," *IEEE J. Lightwave Technol.,* Vol. 12, No. 5, pp. 891-8, May 1994)

Indeed, because the combination of polarization-dependent loss (PDL), polarization dependent gain (PDG) and PMD all contribute to fading in WDM systems, most existing WDM systems employ polarization scrambling to minimize unwanted fading, thereby teaching against any use of PDM for increased channel capacity. For example, in U.S. Pat. No. 6,137,925, Stimple et al. disclose a multi-wavelength polarization scrambling device intended to minimize the correlation of signal polarization in a WDM channel.

Nevertheless, some practitioners proposed using PDM with soliton trains to overcome specific problems unrelated to optical fiber channel capacity. For instance, in U.S. Pat. No. 6,188,768 B1, Bethune et al. disclose an autocompensating quantum cryptographic key distribution system based on using soliton trains with PDM to ensure the impossibility of accurate eavesdropping. Others propose using PDM in free-space optical communications systems not subject to significant PMD. For example, Kuri et al. ("Multiple Polarization Modulation (MPLM) System for Coherent Optical Space Communication," *Global Telecommunications Conference, 1995. GLOBECOM '95., IEEE,* Vol. 3, pp. 2003-2007, 1995) proposes a novel MPLM system for the simultaneous independent transmission of modulated subcarriers and baseband signals. Kuri et al individually modulate the polarization ellipticity angle and the polarization azimuth angle with the modulated subcarriers and baseband signals, respectively, to avoid phase noise and polarization axis mismatch at the receiver.

Recently, some practitioners have proposed using sophisticated variations of the basic PDM concept to improve particular features of optical fiber channel performance. For example, in U.S. Pat. No. 5,900,957, Van Der Tol discloses an optical packet switching system that encodes the data and address information in two orthogonally-polarized signals that may be easily separated using passive optical devices. Van Der Tol observes that glass fibers usually do not maintain polarization over kilometer distances and therefore suggest several features intended to protect the relative orthogonality of the two polarized signals over long distances, a feature reminiscent of the earlier soliton train PDM systems. In another example, Hayee et al. (Summaries of Papers Presented at the *Conference on Lasers and Electro-Optics, 1999. CLEO '99.* pp, 181-182, 1999) describe a method for multiplexing two orthogonal polarizations of the same wavelength in a power ratio of two-to-one to partially overcome the well-known impracticality of PDM over kilometer distances because of random variations in fiber birefringence. By decorrelating the two signals in time, unbalancing them in power, and operating the modulators only in binary mode to exploit its full extinction ratio, Hayee et al. manage to squeeze enough improvement out of the PDM technique to demonstrate useful performance over a 95-km fiber. In yet another example, Zheng et al. ("Suppression of Interferometric Crosstalk and ASE Noise Using a Polarization Multiplexing Technique and a SOA," *IEEE Photon. Technol. Lett,* Vol. 12, No. 8, pp. 1091-1093, August 2000) propose a PDM technique for overcoming amplified spontaneous emission (ASE) noise from optical amplifiers and crosstalk at the signal wavelength. Using a semiconductor optical amplifier (SOA), Zheng et al. multiplex an optical signal and its inverse as two orthogonally-polarized signals, the amplitudes of which add to a fixed value of logical one. Transmitting the two signals from the same SOA results in a fixed saturated output power level that solves the ASE and interference problems (both are significantly suppressed by the saturated SOA). The original signal is demultiplexed at the receiver with a polarization beam splitter (PBS) but Zheng et al. do not consider operation over fibers longer than 45 km. Similarly, Srivastava et al. ("A Polarization Multiplexing Technique to Mitigate WDM Crosstalk in SOAs," *IEEE Photon. Technol. Lett,* Vol. 12, No. 10, pp. 1415-6, October 2000) suggests using polarization multiplexing to overcoming the effects of the crosstalk arising from SOA gain saturation. Two orthogonally-polarized optical signals are modulated with the data stream and its complement before being combined to from a signal having a constant average power without bit transition patterns. The two wavelength channels are then decorrelated by sending through a 10-km single-mode fiber to introduce a delay between the two channels. They report an additional 1 dB bit error rate (BER) power penalty because of the accumulated dispersion through the decorrelation and transmission fiber sections but do not discuss PMD or polarization dispersion loss (PDL).

As may be readily appreciated from these examples, there is a clearly-felt need in the art for a modulation method that improves the capacity of an optical channel subject to random fluctuations in fiber birefringence over long distances. These unresolved problems and deficiencies are clearly felt in the art and are solved by this invention in the manner described below.

SUMMARY OF THE INVENTION

This invention solves the above-cited problem by providing for the first time an optical signal multiplexer/demultiplexer employing an orthogonal pseudorandom (PRN) coding scheme for optical mode modulation to produce a plurality of independent optical signals that may be combined into one multiplex signal for transmission over an optical fiber to the receiving end, where the multiplex signal may be demultiplexed by relying on the orthogonal properties of the PRN code to isolate each independent optical signal from the transmitted multiplex signal. In channels subject to mode modulation distortion, one of the signal components may be used as a pilot signal to obtain a correction for channel mode modulation distortion. The PRN optical signal multiplexer/demultiplexer is particularly useful with polarization mode modulation.

It is a purpose of this invention to provide a mode modulation method that permits transmission of a plurality of independent optical signals through an optical channel. It is a feature of the method of this invention that a plurality of independent optical signals may be multiplexed and transmitted through free space or an optical waveguide and recovered at the receiving end by demultiplexing.

In one aspect, the invention is a method for transmitting a plurality (I) of independent optical signals $\{S_i\}$ through an optical channel having two ends, including the steps of generating a plurality (I) of independent pseudorandom bit sequences (PRBSs), modulating a preselected optical mode of the $i^{th}$ independent optical signal $S_i$ according to the $i^{th}$ independent pseudorandom bit sequence $PRBS_i$ to form an $i^{th}$ modulated optical signal $MS_i$, where $i=\{1, \ldots I\}$, combining a plurality (I) of the modulated optical signals $\{MS_i\}$ to form an optical multiplex signal, transmitting the optical multiplex signal through the optical channel from one end to the other end, modulating the preselected optical mode of the optical multiplex signal according to the $i^{th}$ pseudorandom bit sequence $PRBS_i$ to form an $i^{th}$ modulated multiplex signal $MMS_i$, and passing the $i^{th}$ modulated multiplex signal $MMS_i$ through a mode filter, whereby the independent optical signal $S_i$ is recovered.

In an exemplary embodiment, the invention is an apparatus for transmitting a plurality (I) of independent optical signals $\{S_i\}$ in an optical channel, including a first pseudorandom bit sequence (PRBS) generator for generating a plurality (I) of independent PRBSs, a plurality (I) of electro-optical modulators each coupled to the PRBS generator and disposed to modulate the polarization mode of the $i^{th}$ optical signal $S_i$ according to the $i^{th}$ pseudorandom bit sequence $PRBS_j$ to form a modulated optical signal $MS_i$, where $i=\{1, \ldots I\}$, an optical combiner disposed at one end of the optical channel for combining a plurality (I) of the modulated optical signals $\{MS_i\}$ to form an optical multiplex signal, optical channel input means coupled to the optical combiner for accepting the optical multiplex signal for transmission through the optical channel, at least one electro-optical modulator coupled to the PRBS generator and disposed at the other end of the optical channel for modulating the polarization mode of the optical multiplex signal according to the $i^{th}$ pseudorandom bit sequence $PRBS_i$ to form an $i^{th}$ modulated multiplex signal $MMS_i$, and a polarized filter disposed at the other end of the optical channel to filter the $i^{th}$ modulated multiplex signal $MMS_i$, whereby the independent optical signal $S_i$ is recovered.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIGS. 2A-B are schematic diagrams illustrating the system of this intention for transmitting a polarization mode distortion (PMD) pilot signal through a single optical channel;

DESCRIPTION OF THE PREFERRED EMBODIMENT

In a pseudorandom (PRN) coding scheme, the signal energy is spread over some signal parameter, such as phase or frequency, according to one of a set of data sequences that are statistically orthogonal. In the system of this invention, the signal energy is spread in an optical mode, such as polarization, before transmission over a common optical channel. Thus, several independent optical signals may each be spread in mode and combined for transmission over a single channel, as may be appreciated with reference to FIG. 1.

Figure 1:
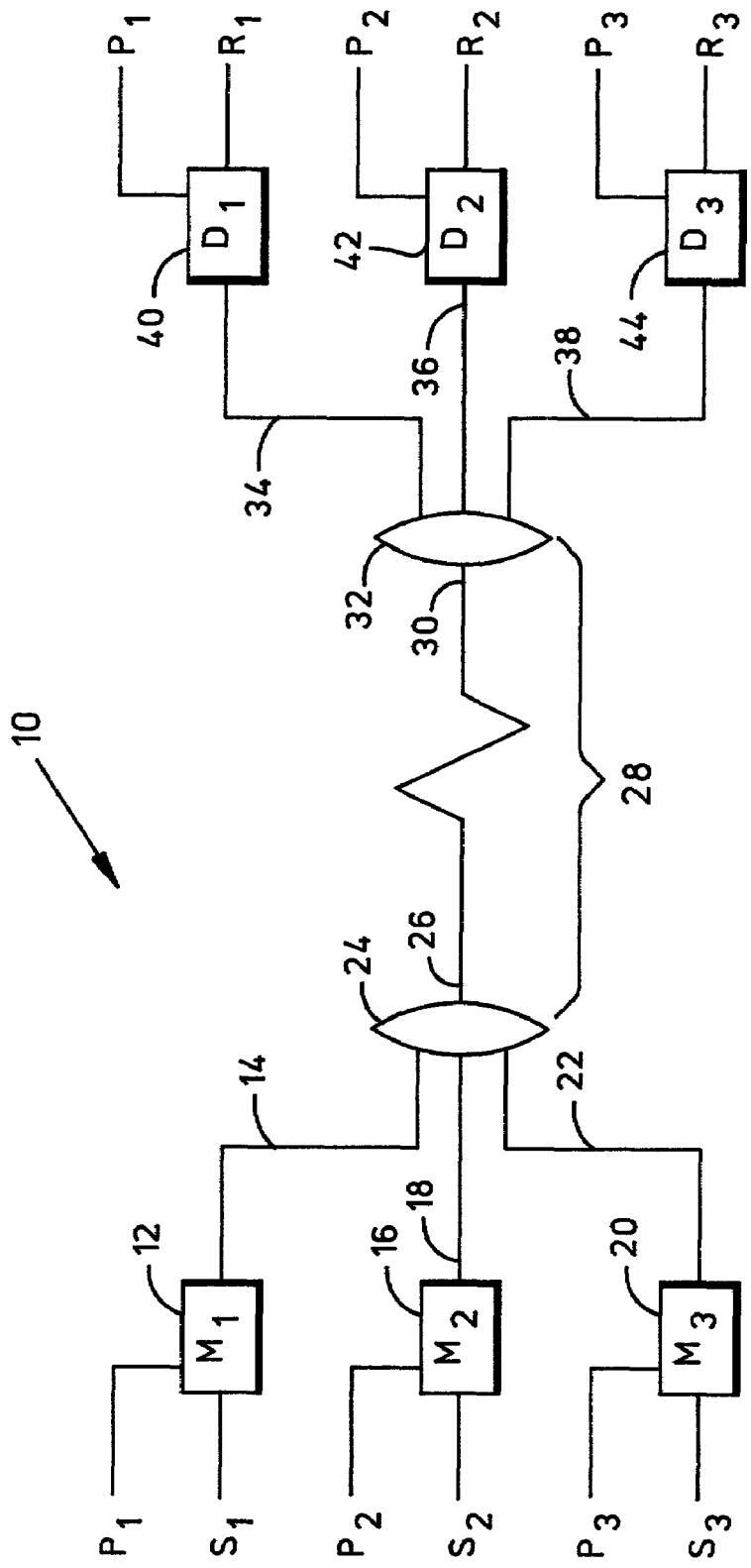
FIG. 1 is a schematic diagram illustrating the system of this invention for transmitting a plurality (I) of independent optical signals $\{S_i\}$ through a single optical channel.

FIG. 1 is a schematic diagram illustrating the system 10 of this invention for transmitting a plurality (I) of independent optical signals $\{S_i\}$ through a single optical channel. Three independent optical signals $S_1$, $S_2$ and $S_3$, each of which may be amplitude-modulated and of identical frequency and phase, for example, are shown coupled to separate mode modulators, which may include, for example, electro-optical polarizers. The three mutually orthogonal PRN sequences $P_1$, $P_2$ and $P_3$ each have a white or Gaussian spectral density function and may include a Gold code, Walsh code, or any other suitable digital sequence having the necessary orthogonality and white spectral characteristics. The mode modulator 12 accepts a PRN sequence $P_1$ and varies the polarization mode of signal $S_1$ to produce the modulated optical signal 14. Similarly, the mode modulator 16 accepts a PRN sequence $P_2$ and varies the polarization mode of signal $S_2$ to produce the modulated optical signal 18 and the mode modulator 20 accepts a PRN sequence $P_3$ and varies the polarization mode of signal $S_3$ to produce the modulated optical signal 22. This example includes only three signals but may be scaled to larger numbers of signals.

Modulated optical signals 14, 18, and 22 are accepted at the optical combiner 24 wherein they are combined to from a single optical multiplex signal that is coupled to one end 26 of the optical channel 28. The other end 30 of optical channel 28 is coupled to an optical splitter 32, which splits the single optical multiplex signal into the three optical multiplex signal copies 34, 36 and 38. Optical multiplex signal 34 is coupled to the mode demodulator 40, which may include, for example, an electro-optical polarizer and a polarization filter. Similarly, optical multiplex signal 36 is coupled to the mode demodulator 42 and optical multiplex signal 38 is coupled to the mode demodulator 44.

The operation of mode modulators 40, 42 and 44 are very similar and may be appreciated from the description of mode modulator 40. PRN sequences $P_1$, $P_2$ and $P_3$ are reproduced at the receiving end 30 of optical channel 28 by any useful method known in the art. For example, a second PRN generator may be employed with the same algorithms and seed values to produce the PRN sequences $P_1$, $P_2$ and $P_3$ in synchronization with the PRN generator employed to produce the PRN sequences $P_1$, $P_2$ and $P_3$ used at the end 26 of optical channel 28. As another example, synchronization data bits may be transferred as an additional signal $S_4$ (not shown) through optical channel 28. PRN sequence $P_1$ is coupled to mode demodulator 40, which modulates the polarization mode of optical multiplex signal 34 accordingly to produce an intermediate modulated multiplex signal $MMS_1$ (not shown). Intermediate modulated multiplex signal $MMS_1$ is then filtered to remove all optical signal power having a polarization mode that is uncorrelated with PRN sequence $P_1$, leaving the recovered signal $R_1 = S_1$.

In channels with polarization mode modulation distortion (PMD), which is generally slowly varying or invariant, one of the optical signals may be used as a PMD pilot signal $S_p$ to obtain a correction for channel PMD by introducing a variable delay between the quadrature components of the pilot signal $S_p$ and varying the delay as necessary to properly recover the pilot signal $S_p$. For example, a single-mode fiber from a splitter can be rotated physically to orthogonalize the signal polarization between the splitter outputs and the components then combined and transmitted as a pilot signal $S_p$ with a known relative polarization. By splitting the two orthogonal pilot signal components at the receiver and varying the time delay between them, a correction for mode dispersion may be determined and used to correct other contemporaneous signals subjected to the same mode dispersion in the common optical channel. FIGS. 2A-B are schematic diagrams illustrating the system of this invention for transmitting a PMD pilot signal $S_p$ through a single optical channel. FIG. 2A shows the transmit end apparatus 46 and FIG. 2B shows the receive end apparatus 48 for the PMD pilot signal $S_p$.

In FIG. 2A, a laser 50 creates an optical signal 52, which is passed though a half-wave plate 54 to fix its polarization mode and a beam-splitter 54 to generate two identical optical signals 56 and 58 having a known state of polarization (SOP). A pilot signal bit sequence 60 is applied to the two identical mode modulators 62 and 64 to create two identical modulated pilot signals 66 and 68, which are coupled via polarization-maintaining fibers to the respective arms of the polarization combiner 70. Each arm of polarization combiner 70 properly couples only through one SOP, which is acquired by appropriately rotating the polarization-maintaining optical fibers carrying signals 66 and 68 with respect to the respective fibers in polarization-combiner 70. Thus, polarization combiner 70 adds two orthogonally-polarized pilot signals 66 and 68 to produce a dual-SOP pilot signal 72, which is transmitted through the optical channel 74.

In FIG. 2B, dual-SOP pilot signal 72 arrives at the 2-by-2 optical coupler 76. The laser 78 generates an optical signal for heterodyne recovery of the pilot signals in the usual manner. The output of laser 78 is rotated by the quarter-wave plate 80 and the half-wave plate 82 to select either one of the two SOPs in dual-SOP pilot signal 72. One of the optical outputs 84 and 86 from 2-by-2 optical coupler 76 is passed through a variable length path 88 to introduce a relative delay that represents the PMD in the channel are detected and processed in the signal processor 90, which may include optical detectors, a mixer and a phase-lock loop, to recover the original pilot signal bit sequence 60. Processor 90 provided an automatic frequency control (AFC) signal 92 and a PMD compensation signal 94, which may be used to correct for the slowly varying mode distortion in channel 74.

Figure 3:
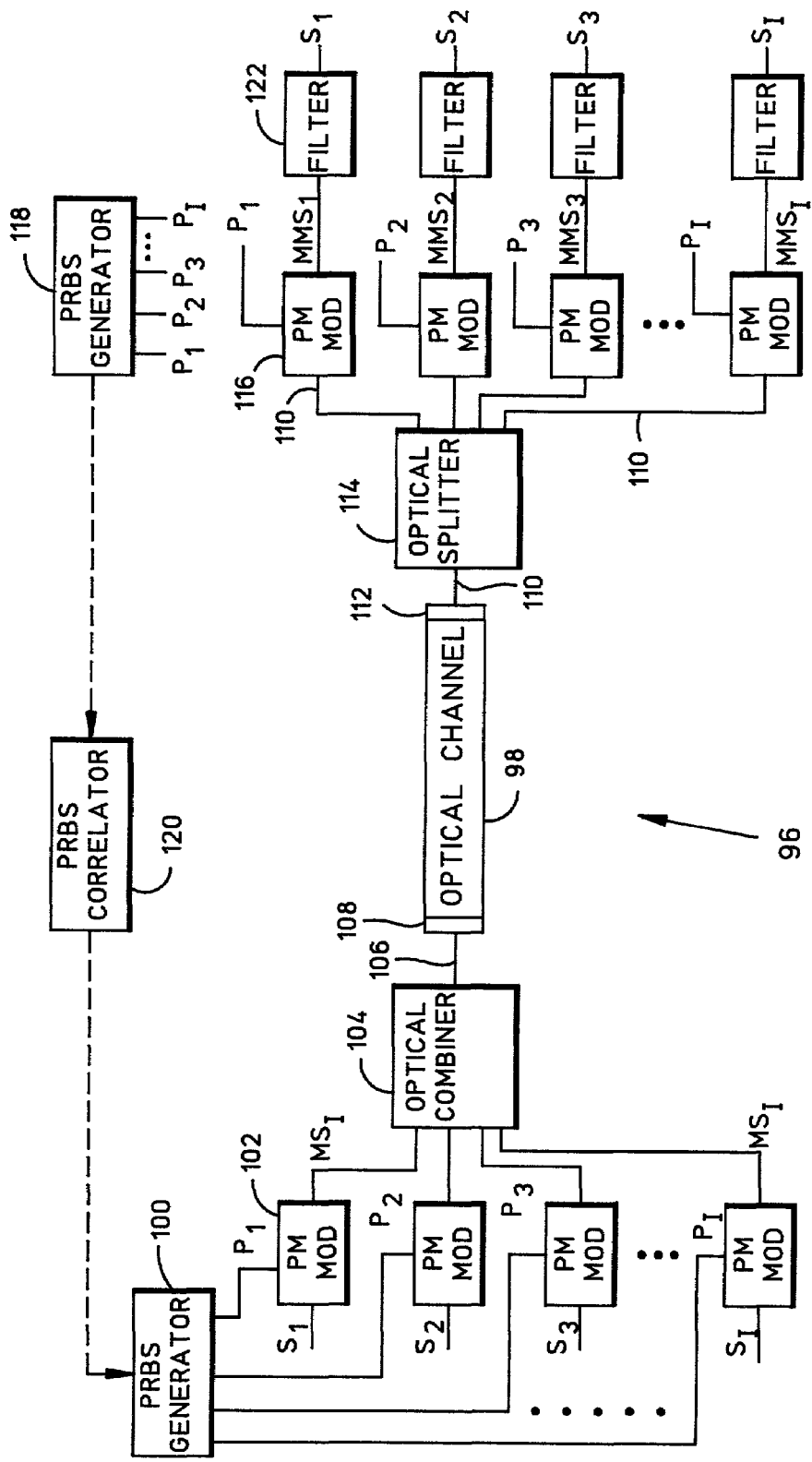
FIG. 3 is a block diagram illustrating an exemplary embodiment of the apparatus of this invention for transmitting a plurality (I) of independent optical signals $\{S_i\}$ through a single optical channel.

FIG. 3 is a block diagram illustrating an exemplary embodiment of the apparatus 96 of this invention for transmitting a plurality (I) of independent optical signals $\{S_i\}$ through a single optical channel 98, which may include free space or an optical waveguide or the like. A pseudorandom bit sequence (PRBS) generator 100 provides a set of code sequences $\{P_i\}$ that have the mutually orthogonal and white spectral properties known in the signal processing arts for code division multiplexing. Thus, as is well-known for such code sequences, $P_i$ is uncorrelated with $P_j$ if $i \neq j$ and $P_i$ has a white spectral density and is unlikely to introduce any ambiguities when added to another signal. A plurality of electro-optical modulators exemplified by the electro-optical modulator 102 are each disposed to accept one signal $S_i$ of a plurality of independent optical signals $\{S_i\}$, which may be, for example, an amplitude-modulated laser output signal carrying data that is to be transmitted through optical channel 98. Electro-optical modulator 102 accepts the optical signal $S_i$ and modulates the polarization mode of $S_1$ according to the PRBS $P_1$ to produce the modulated optical signal $MS_1$. The other electro-optical modulators operate similarly and together produce the plurality of modulated optical signals $\{MS_i\}$, which are coupled to the optical combiner 104. Optical combiner 104 merely adds the plurality of modulated optical signals $\{MS_i\}$ to form a single optical multiplex signal 106, which is coupled to the optical channel input 108.

After propagating through optical channel 98, an optical multiplex signal 110, representing a version of optical multiplex signal 106 with some degree of additional noise and distortion, is coupled by way of the optical channel output 112 to an optical splitter 114, which creates a plurality of identical copies of optical multiplex signals 110. Another plurality of electro-optical modulators, exemplified by the electro-optical modulator 116, are each disposed to accept one copy of optical multiplex signals 110. A second PRBS generator 118 provides the set of code sequences $\{P_i\}$ and is synchronized with PRBS generator 100 by any useful means known in the art, such as a synchronous clock recovery scheme or an additional PRBS correlator 120 disposed to ensure accurate duplication and synchrony of the PRBSs 100 and 118 at each end of optical channel 98. Electro-optical modulator 116 accepts optical multiplex signal 110 and modulates the polarization mode thereof according to $P_1$ to produce the modulated multiplex signal $MMS_1$ in which all of the energy correlated with $P_1$ is now propagating in a single SOP. Modulated multiplex signal $MMS_1$ is then filtered by a polarized mode filter 122 to remove all signal energy except the energy having the SOP for which mode filter 122 is tuned. Because of the fixed SOP, mode filter 122 passes only the energy in $MMS_1$ that is correlated to $P_1$. This includes only the original $S_1$ because all other energy is uncorrelated by virtue of the orthogonality of the set of PRBSs $\{P_i\}$. The other electro-optical modulators operate similarly and together produce the plurality of modulated multiplex signals $\{MMS_i\}$, each of which is then filtered by a mode filter tuned to a single SOP, thereby recovering the plurality (I) of independent optical signals $\{S_i\}$. If desired, the SOP of the mode filters, exemplified by mode filter 122, may be dynamically adjusted to compensate for PMD in optical channel 98 by some means such described above in connection with FIGS. 2A-2B.

Figure 4:
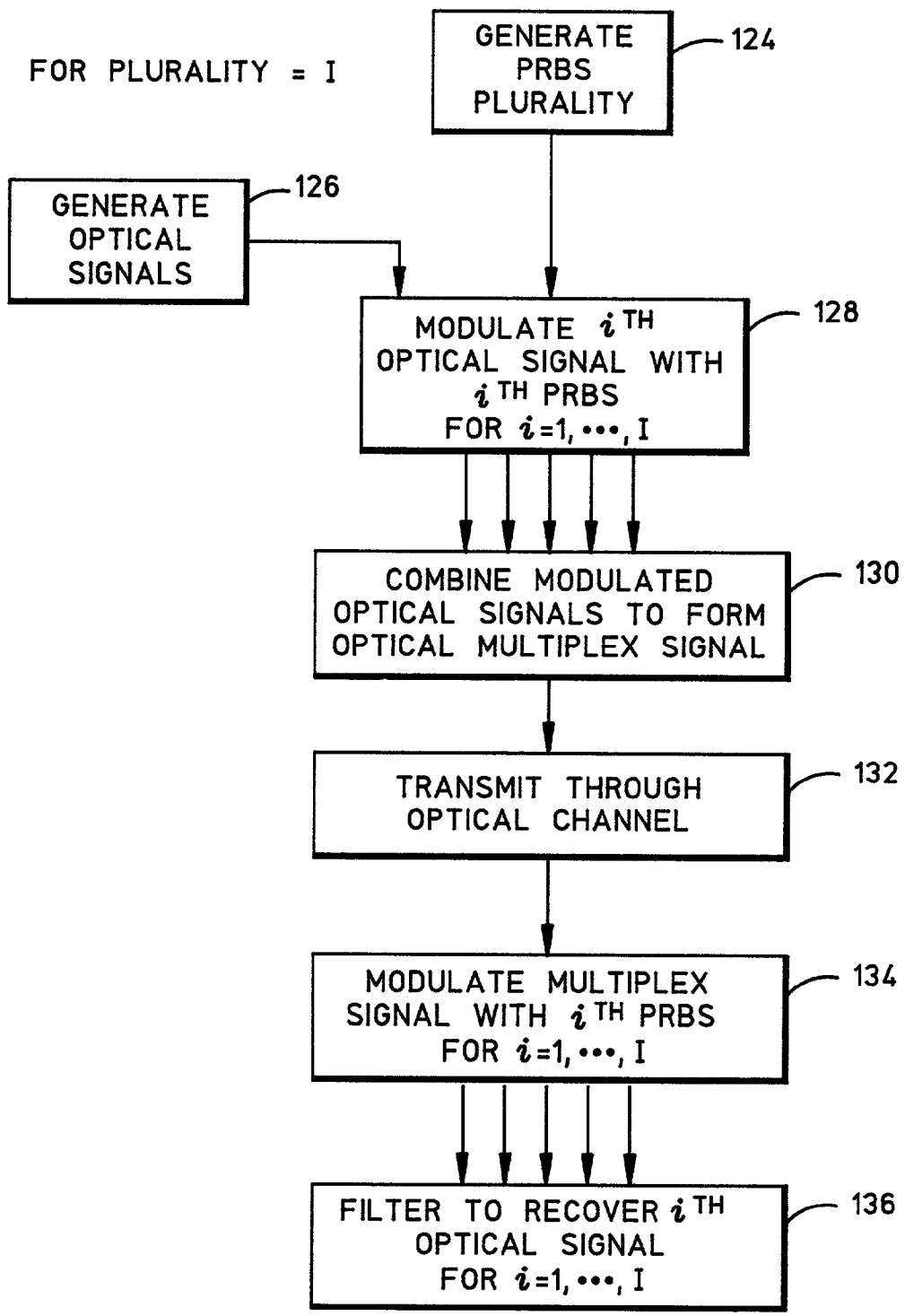
FIG. 4 is a schematic diagram of a flowchart illustrating the method of this invention for transmitting a plurality (I) of independent optical signals $\{S_i\}$ through a single optical channel.

FIG. 4 is a schematic diagram of a flowchart illustrating the method of this invention for transmitting a plurality (I) of independent optical signals $\{S_i\}$ through a single optical channel. In the first step 124, the plurality (I) of PRBSs $\{P_i\}$ is generated and, in step 126, the plurality (I) of independent optical signals $\{S_i\}$ is produced. In the next step 128, a preselected optical mode, such as the SOP, of the independent optical signal $S_i$ is modulated with the $i^{th}$ PRBS $P_i$ to form an $i^{th}$ modulated optical signal $MS_i$, for i={1, . . . I}. In the step 132, the plurality (I) of modulated optical signals $\{MS_i\}$ is combined into an optical multiplex signal, which is transmitted through the optical channel from one end to the other in the step 132. In step 134, the preselected optical mode of the received optical multiplex signal is modulated with the $i^{th}$ PRBS $P_i$ to form an $i^{th}$ modulated multiplex signal $MMS_i$. Finally, in the last step 136, the $i^{th}$ modulated multiplex signal $MMS_i$ is filtered with a mode filter to remove uncorrelated energy and recover the independent optical signal $S_i$. Each of these steps may be repeated for i={1, . . . I} if appropriate.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A method of transferring a plurality (I) of independent optical signals $\{S_i\}$ through an optical channel having two ends, the method comprising the steps of:
   (a) generating a plurality of (I) independent pseudorandom bit sequences (PRBSs);
   (b) modulating a preselected optical mode of the $i^{th}$ independent optical signal $S_i$ according to the $i^{th}$ independent pseudorandom bit sequence $PRBS_i$ to form an $i^{th}$ modulated optical signal $MS_i$, where i={1, . . . I};
   (c) combining a plurality (I) of the modulated optical signals {MSi} to form an optical multiplex signal;
   (d) transmitting the optical multiplex signal through the optical channel from one end to the other end;
   (e) modulating the preselected optical mode of the optical multiplex signal according to the $i^{th}$ pseudorandom bit sequence $PRBS_i$ to form an $i^{th}$ modulated multiplex signal $MMS_i$; and
   (f) passing the $i^{th}$ modulated multiplex signal $MMS_i$ through a mode filter, whereby the independent optical signal $S_i$ is recovered.

2. The method of claim 1 wherein the preselected optical mode comprises an optical polarization mode.

3. The method of claim 2 wherein the optical channel comprises an optical waveguide.

4. The method of claim 3 wherein the optical channel comprises a fiber optical channel.

5. The method of claim 2 wherein the optical channel comprises free space.

6. The method of claim 5 wherein the plurality (I) of independent PRBSs are mutually orthogonal.

7. The method of claim 2 wherein the plurality (I) of independent PRBSs are mutually orthogonal.

8. The method of claim 1 wherein the optical channel comprises an optical waveguide.

9. The method of claim 8 wherein the plurality (I) of independent PRBSs are mutually orthogonal.

10. An apparatus for transferring a plurality (I) of independent optical signals $\{S_i\}$ through an optical channel having two ends, the apparatus comprising:
   a first pseudorandom bit sequence (PRBS) generator for generating a plurality (I) of independent PRBSs;
   a plurality (I) of electro-optical modulators each coupled to the PRBS generator and disposed for modulating the polarization mode of the $i^{th}$ optical signal $S_i$ according to the $i^{th}$ pseudorandom bit sequence PRBS to form a modulated optical signal $MS_i$ where i={1, . . . I};
   an optical combiner disposed at one end of the optical channel for combining a plurality (I) of the modulated optical signals $\{MS_i\}$ to form an optical multiplex signal for transmission through the optical channel;
   at least one electro-optical modulator coupled to the PRBS generator and disposed at the other end of the optical channel for modulating the polarization mode of the optical multiplex signal according to the $i^{th}$ pseudorandom bit sequence $PRBS_i$ to form an $i^{th}$ modulated multiplex signal $MMS_i$; and
   a polarized filter disposed at the other end of the optical channel for filtering the $i^{th}$ modulated multiplex signal $MMS_i$, whereby the independent optical signal $S_i$ is recovered.

11. The apparatus of claim 10 further comprising:
   a second PRBS generator disposed at the other end of the optical channel; and
   correlator means for correlating the PRBSs from the second PRBS generator with the PRBSs from the first PRBS generator.

12. The apparatus of claim 11 further comprising:
   an optical splitter disposed at the other end of the optical channel for splitting the optical multiplex signal to form a plurality (I) of optical multiplex signal copies $\{MSC_i\}$;

a plurality (I) of electro-optical modulators, each coupled to the second PRBS generator and disposed at the other end of the optical channel for modulating the polarization mode of the $i^{th}$ multiplex optical signal copy $MSC_i$ according to the $i^{th}$ pseudorandom bit sequence $PRBS_i$ to form a modulated multiplex signal $MMS_i$; and a plurality (I) of polarized filters, each disposed at the other end of the optical channel for filtering the $i^{th}$ modulated multiplex signal $MMS_i$, whereby the plurality (I) of independent optical signal $\{S\}$ are recovered.

13. The apparatus of claim 12 wherein the optical channel comprises an optical waveguide.

14. The apparatus of claim 13 wherein the optical channel comprises a fiber optical channel.

15. The apparatus of claim 11 wherein the optical channel included mode distortion and at least one independent optical signal $S_p$ is transmitted through the optical channel, the apparatus further comprising:

distortion recovery means for recovering the optical channel mode distortion from the independent optical signal $S_p$.

16. The apparatus of claim 15 wherein the optical channel comprises free space.

17. The apparatus of claim 10 wherein the optical channel comprises an optical waveguide.

18. The apparatus of claim 17 wherein the optical channel comprises a fiber optical channel.

19. The apparatus of claim 10 wherein the optical channel comprises free space.

20. The apparatus of claim 10 wherein the plurality (I) of independent PRBSs are mutually orthogonal.

21. An apparatus for receiving, from an optical channel, an optical multiplex signal representing a plurality (I) of independent optical signals $\{S_i\}$ and for recovering therefrom an independent optical signal $S_i$, the apparatus comprising:

receiving means for accepting the optical multiplex signal from the optical channel;

a first pseudorandom bit sequence (PRBS) generator for generating a plurality (I) of independent PRBSs;

at least one electro-optical modulator coupled to the PRBS generator for modulating the polarization mode of the optical multiplex signal according to the $i^{th}$ pseudorandom bit sequence $PRBS_i$ to form an $i^{th}$ modulated multiplex signal $MMS_i$; and a polarized filter for filtering the $i^{th}$ modulated multiplex signal $MMS_i$, whereby the independent optical signal $S_i$ is recovered.

22. The apparatus of claim 21 wherein a second PRBS generator is disposed at the other end of the optical channel, the apparatus further comprising:

correlator means for correlating the PRBSs from the first PRBS generator with the PRBSs from the second PRBS generator.

23. The apparatus of claim 22 further comprising:

an optical splitter for splitting the optical multiplex signal to form a plurality (I) of optical multiplex signal copies $\{MSC_i\}$;

a plurality (I) of electro-optical modulators, each coupled to the first PRBS generator for modulating the polarization mode of the $i^{th}$ multiplex optical signal copy $MSC_i$ according to the $i^{th}$ pseudorandom bit sequence $PRBS_i$ to form a modulated multiplex signal $MMS_i$; and a plurality (I) of polarized filters for filtering the $i^{th}$ modulated multiplex signal $MMS_i$ whereby the plurality (I) of independent optical signal $\{S_i\}$ are recovered.

24. The apparatus of claim 23 wherein the optical channel comprises an optical waveguide.

25. The apparatus of claim 24 wherein the optical channel comprises a fiber optical channel.

26. The apparatus of claim 22 wherein the optical channel included mode distortion and at least one independent optical signal $S_p$ is transmitted through the optical channel, the apparatus further comprising:

distortion recovery means disposed at the other end of the optical channel for recovering the optical channel mode distortion from the independent optical signal $S_p$.

27. The apparatus of claim 26 wherein the optical channel comprises free space.

28. The apparatus of claim 21 wherein the optical channel comprises an optical waveguide.

29. The apparatus of claim 28 wherein the optical channel comprises a fiber optical channel.

30. The apparatus of claim 21 wherein the optical channel comprises free space.

31. The apparatus of claim 21 wherein the plurality (I) of independent PRBSs are mutually orthogonal.

* * * * *

UNITED STATES PATENT AND TRADEMARK OFFICE
CERTIFICATE OF CORRECTION

PATENT NO. : 7,280,764 B2 Page 1 of 1
APPLICATION NO. : 10/087386
DATED : October 9, 2007
INVENTOR(S) : Ken A Nishimura It is certified that error appears in the above-identified patent and that said Letters Patent is hereby corrected as shown below:

Col. 8, Line 6 in Claim 1, delete "{MS}" and insert --{$MS_i$}--, therefor.

Col. 8, Line 21 in Claim 10, delete "PRBS" and insert --$PRBS_i$--, therefor.

Col. 9, Line 10 in Claim 12, delete "{S}" and insert --{$S_i$}--, therefor.

Signed and Sealed this

Thirtieth Day of June, 2009

JOHN DOLL
*Acting Director of the United States Patent and Trademark Office*